United States Patent [19]

Büchel et al.

[11] Patent Number: 4,924,063

[45] Date of Patent: May 8, 1990

[54] METHOD AND APPARATUS FOR DETERMINING THE POSITION OF A WELD GROOVE FOR LASER WELDING

[75] Inventors: Manfred Büchel, Mülheim; Norbert Hangmann, Oberhausen, both of Fed. Rep. of Germany

[73] Assignee: Fried. Krupp Gesellschaft mit beschränkter Haftung, Essen, Fed. Rep. of Germany

[21] Appl. No.: 404,908

[22] Filed: Sep. 8, 1989

[30] Foreign Application Priority Data

Sep. 10, 1988 [DE] Fed. Rep. of Germany ....... 3830892

[51] Int. Cl.[5] .............................................. B23K 26/00
[52] U.S. Cl. ........................... 219/121.64; 219/121.78; 219/121.83
[58] Field of Search ............... 219/121.63, 121.64, 219/121.78, 121.75, 121.8, 121.83, 124.34

[56] References Cited

U.S. PATENT DOCUMENTS

| | | | |
|---|---|---|---|
| 3,016,464 | 1/1962 | Bailey | 219/121.81 |
| 4,667,082 | 8/1987 | Shibata et al. | 219/124.34 |
| 4,700,045 | 10/1987 | Merry et al. | 219/121.8 X |
| 4,764,655 | 8/1988 | Ortiz, Jr. et al. | 219/121.64 |
| 4,812,614 | 3/1989 | Wang et al. | 219/124.34 |

OTHER PUBLICATIONS

Beckmann, "Elektrooptischer Sensor für due Automatisierung des Lichtbogenschweissens" (Electr--Optical Sensor for Use in Automated Arc Welding), 1984, Technisches Messen 51, No. 7/8, pp. 259–263.

*Primary Examiner*—C. L. Albritton
*Attorney, Agent, or Firm*—Spencer & Frank

[57] ABSTRACT

A laser welding process includes the steps of deflecting, with an oscillating frequency of at least 100 Hz, a collimated and focused laser measuring beam, intensity-modulated with a frequency of at least 200 kHz, across the path of the weld groove during co-travel with the laser welding beam along the weld groove; directing the laser measuring beam to the workpieces; causing the laser measuring beam to impinge on the workpieces at a distance of maximum 10 mm from the central longitudinal axis of the laser welding beam; sensing, by an electro-optical sensor having a single light-sensitive element, rays of the laser measuring beam reflected by the workpieces; generating, by the sensor, measuring signals in response to the sensed reflected rays; applying follow-up signals in response to the measuring signals, and correcting the position of the laser welding beam by the follow-up device in response to the follow-up signals applied thereto.

5 Claims, 6 Drawing Sheets

FIG. 7 ns systems em-
METHOD AND APPARATUS FOR DETERMINING THE POSITION OF A WELD GROOVE FOR LASER WELDING

CROSS REFERENCE TO RELATED APPLICATION

This application claims the priority of Federal Republic of Germany Application No. P 38 30 892.4 filed Sept. 10th, 1988, which is incorporated herein by reference.

BACKGROUND OF THE INVENTION

This invention relates to a method and an apparatus for determining the position of a weld groove relative to a predetermined desired position for the purpose of correcting the relative position of the laser work beam to the weld groove. The method includes the steps of alternatingly deflecting a collimated laser measuring beam back and forth about the path of the weld groove and focusing the beam, and after reflection from the workpiece in which the weld groove is formed, the beam is received by an electro-optical sensor which is operatively connected to a follow-up device for correcting the position of the laser working beam.

When using a laser for welding, in case of a straight welded seam, preferably the beginning and the end point of a weld groove are determined with the aid of a measuring beam accurately oriented in the direction of the axis of the main or welding laser beam. The determined points are inputted in the control program for the main laser beam and the weld is made according to a predetermined program—in the present case a straight line—between the determined points.

During welding, however, the problem is encountered that a prepared weld seam does not always correspond to the desired course. This may occur, for example, due to improper preparation of the weld groove and/or an imprecise programming of, for example, a non-linear path for the groove. In such a case, the program-controlled main laser beam may be guided out of alignment with the center of the weld groove which leads to grave welding errors.

As described, for example, in "Technisches Messen" (Industrial Measurements) 51, No. 7/8, pages 259–263, seam-seeking systems are known for automatic electric arc welding in which the prepared weld groove is scanned by means of a focused laser measuring beam which sweeps transversely back and forth over the weld groove at a measuring frequency of maximum 10 Hz. If the weld groove deviates from the desired course, the position of the laser welding beam or the welding torch relative to the weld groove is corrected accordingly. In these prior art seam-seeking systems, a row of photodiodes are employed as sensors. Due to the large number of measuring locations and the time required for evaluation, these seam-seeking systems operate at an accuracy of only about 0.2 to 0.5 mm.

Further, from the art of measuring surface profiles and roughnesses and from the optical memory art (CD [compact disc] art) measuring systems are known which operate with a very high measuring accuracy of about 1 μm. These systems, however, must be brought very close (generally no more than 1 mm) to the object being measured.

The diameter of the focal spot of a focused laser working or welding beam is sometimes only 0.1 to 0.2 mm. Due to the very small size of the laser spot, the weld grooves provided for laser welding also have only very small cross-sectional dimensions. The welding of such weld grooves requires a measuring accuracy in an order of magnitude of half the diameter of the laser spot, that is, about 0.05 mm. The measuring accuracy attainable with prior art seam-seeking systems employed for electric arc welding is thus not sufficient for this purpose.

The feed rate during laser welding may extend to an order of magnitude of 100 mm/s and is thus generally up to ten times greater than the speed used in electric arc welding. For this reason, the measuring frequency of the measuring systems known for electric arc welding is also insufficient since the measurement signals resulting from the oscillating measuring beam do not occur in a sufficiently rapid sequence to cause the main laser beam to follow accurately at the given feed rates.

SUMMARY OF THE INVENTION

It is an object of the invention to provide an improved method and apparatus of the above-mentioned type with which a sufficiently accurate and fast detection of the position of even a curved weld groove prepared for laser welding is ensured at high feed and welding rates of 100 mm/s. The term "sufficiently accurate" is to be understood to mean that the measuring accuracy corresponds at least to one-half the diameter of the focusing spot of the laser working beam.

This object and others to become apparent as the specification progresses, are accomplished by the invention, according to which, briefly stated, the laser welding process includes the steps of deflecting, with an oscillating frequency of at least 100 Hz, a collimated and focused laser measuring beam, intensity-modulated with a frequency of at least 200 kHz, across the path of the weld groove during cotravel with the laser welding beam along the weld groove; directing the laser measuring beam to the workpieces; causing the laser measuring beam to impinge on the workpieces at a distance of maximum 10 mm from the central longitudinal axis of the laser welding beam; sensing, by an electro-optical sensor having a single light-sensitive element, rays of the laser measuring beam reflected by the workpieces; generating, by the sensor, measuring signals in response to the sensed reflected rays; applying follow-up signals in response to the measuring signals, and correcting the position of the laser welding beam by the follow-up device in response to the follow-up signals applied thereto.

The proposed laser beam deflection frequency of at least 100 Hz ensures that with a feed rate of 100 mm/s the course of the groove is still covered in a 1 mm "grid".

By modulating the laser measuring beam and by a subsequent demodulation of the sensor signal which has been additionally amplitude-modulated by the workpieces, interferences from the laser welding plasma and from the Planck radiation of the molten bath are eliminated.

The laser source is preferably an inexpensively mass-producible laser diode which enhances a compact, economical construction of the entire apparatus.

In the apparatus for performing the method according to the invention, the laser measuring beam always passes through the central region of a focusing lens arrangement so that by using an achromatic lens as the focusing element, expensive scanner lenses for correction of distortions can be omitted.

DESCRIPTION OF THE PREFERRED EMBODIMENT

Figure 1:
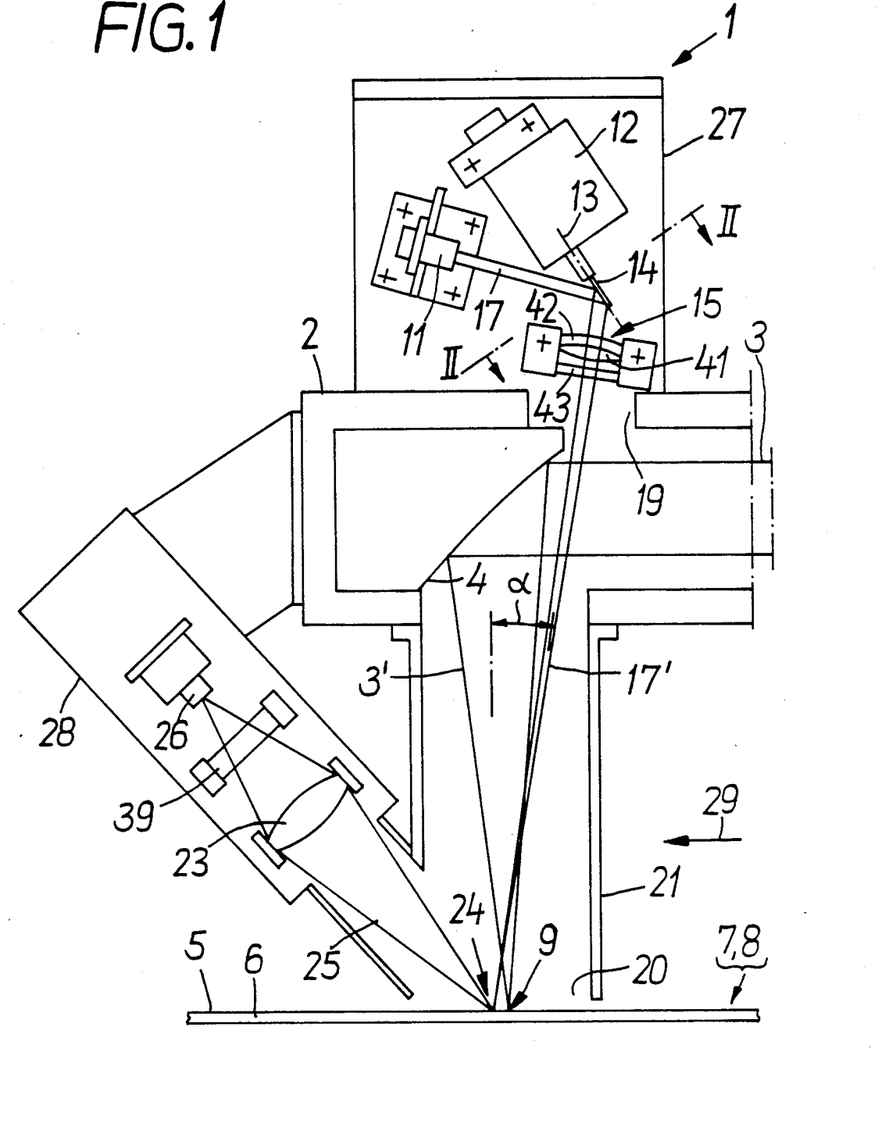
FIG. 1 is a schematic sectional side elevational view of an apparatus for determining the position of a weld groove, according to a preferred embodiment of the invention.
Figure 2:
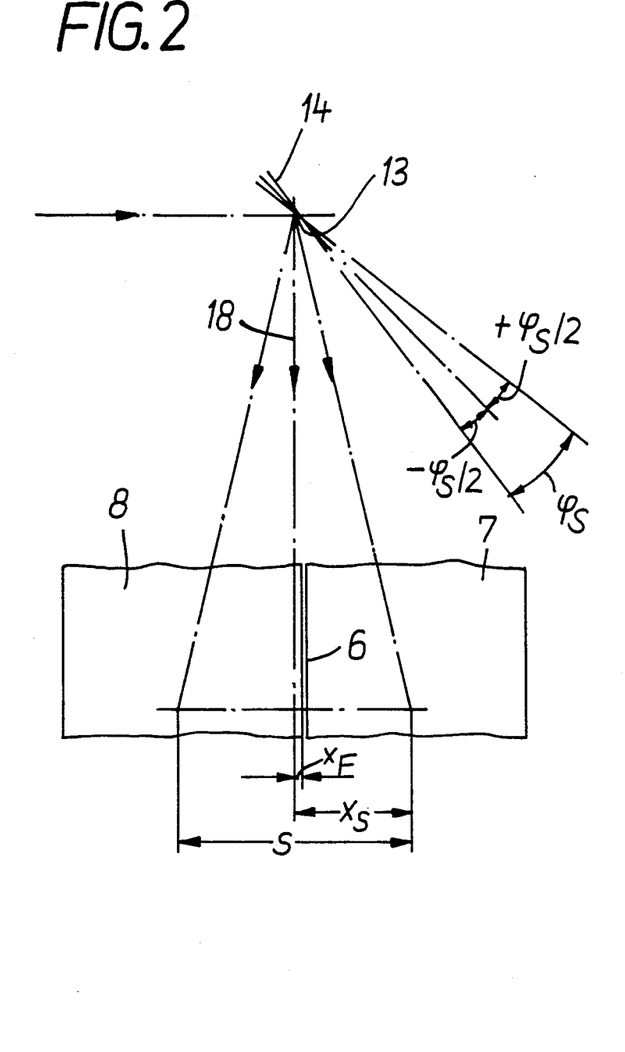
FIG. 2 is a partial sectional view taken along line II—II of FIG. 1, in a greatly distorted illustration.

Turning to FIGS. 1 and 2, the apparatus generally designated at 1 for determining the position of a weld groove by means of a laser measuring beam (hereinafter also briefly referred to as "laser measuring apparatus") is mounted on a laser welding head 2 in which a collimated laser working beam 3 (a beam which has an unchanging cross section) is deflected and focused by the concave focusing mirror 4. The laser welding head 2 is arranged at such a distance from the surface 5 of workpieces 7 and 8 forming the weld groove 6 that the focal point or spot 9 of the focused laser working beam 3' impinges at the height of the surface 5 of workpieces 7 and 8.

The apparatus 1 for determining the position of a weld groove includes a modulatable laser diode 11, a galvanometer scanner 12 (hereinafter also briefly referred to as "scanner") operating in a frequency range from 0 to 250 Hz, a planar deflection mirror 14 driven by the scanner 12 in oscillating motion about an axis 13, as well as an optical focusing system 15. The deflection mirror 14 has a "normal" center position in which the axis of a collimated laser measuring beam 17 emanating from laser diode 11 is deflected in such a manner at a small angle within an imaginary plane 18 containing the pivot axis 13 and extending perpendicular to the surface 5 that it appears ahead of the spot 9 of the focused laser working beam 3'. The laser measuring beam 17' reflected by the mirror 14 is focused by optical focusing system 15 and then penetrates through an upper opening 19 of laser welding head 2 and the exit opening 20 of a protective tube 21 attached to the bottom of the laser welding head 2. If the laser working beam 3, 3' is present, it is penetrated by the laser measuring beam 17, 17'.

The intensity i of the laser beam 17 generated by the laser diode 11 is modulated by a frequency $f_M$ of 200–450 kHz by varying the supply current.

The apparatus 1 includes a further optical focusing system 23 which lies in the imaginary plane 18 and which collects a conical laser beam bundle 25 emanating from spot 24 of the focused laser measuring beam 17'—as part of the total amount of light reflected in a scattered way from spot 24 onto the workpiece surface 5—and images it on a photodiode diode 26 constituting an electro-optical detector or sensor.

The laser diode 11 and the galvanometer scanner 12 together with the mirror 14 are accommodated in a housing 27 which is arranged on the welding head 2. The second optical focusing system 23 and the photodiode 26 are accommodated in a further housing 28 disposed at the frontal face of the welding head 2. The direction of advance of the laser measuring apparatus 1 and the laser welding head 2 relative to the workpieces 7 and 8 is indicated in FIG. 1 by an arrow 29. The direction of advance of moved workpieces relative to a stationary measuring and welding device would accordingly be opposite to the direction indicated by the arrow 29.

The oscillation of the mirror 14 causes the focused laser measuring beam 17' to be moved back and forth on the workpiece surface 5 transversely to the course of the prepared weld groove 6. The scanning range s on the workpiece surface 5 corresponds to an oscillation or scan angle $\phi_s$ of the deflection mirror 14 (the mirror 14 is pivoted back-and-forth from $-\phi_s/2$ to $+\phi_s/2$). The desired value $s_0$ for the scanning range and the desired value $\phi_{s0}$ for the scanning or oscillating angle range can be determined by a desired value generator 31 (which may be integrated).

It is apparent that the laser diode 11 and the scanner 12 together with deflection mirror 14 can be adjusted in their position and direction within the apparatus 1 by non-illustrated means, such as adjustment screws. To the extent possible, the apparatus 1 as a whole is positioned in such a manner that once the mirror 14 is in its "center position", the axis of the focused laser measuring beam 17' coincides with the prepared weld groove 6.

Figure 3:
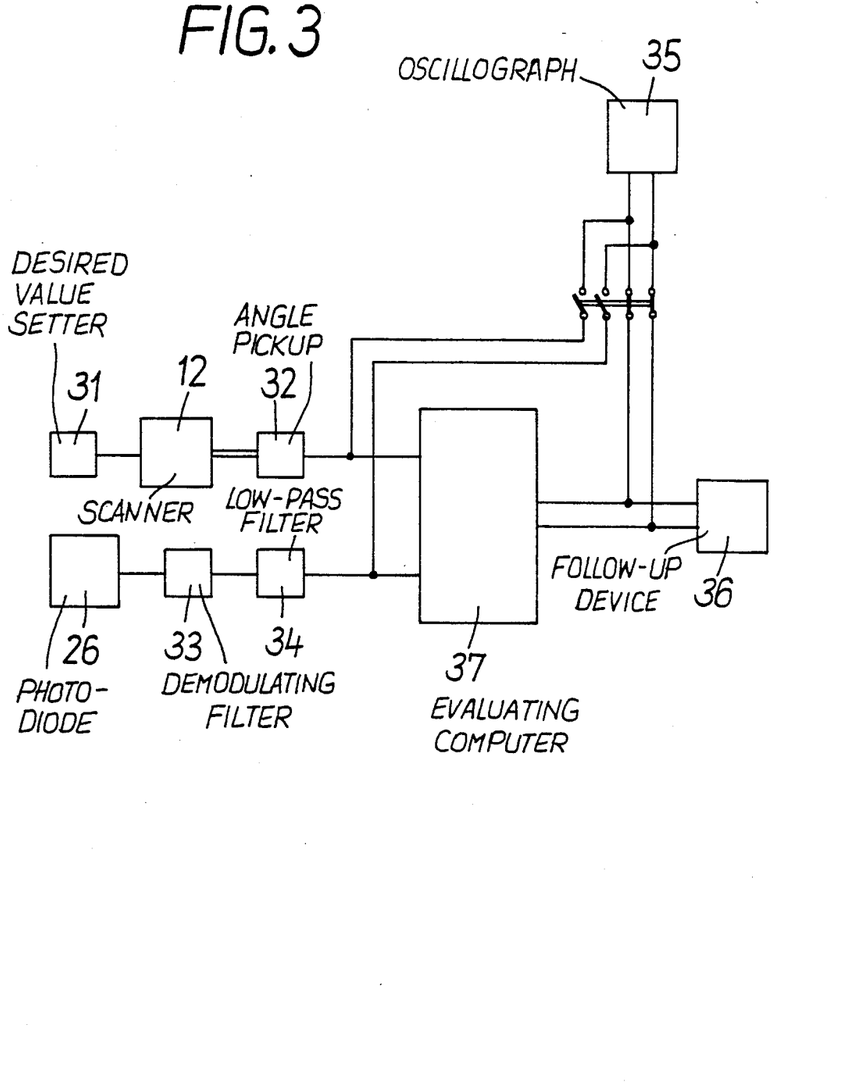
FIG. 3 is a block diagram of a control device incorporated in the preferred embodiment.
Figure 4:
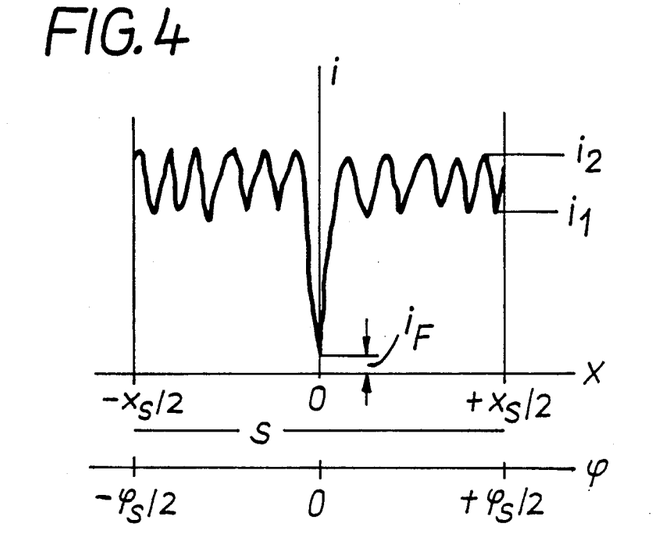
FIG. 4 is a graph illustrating the scattered beam intensity of a measuring state as a function of the scan angle.
Figure 5:
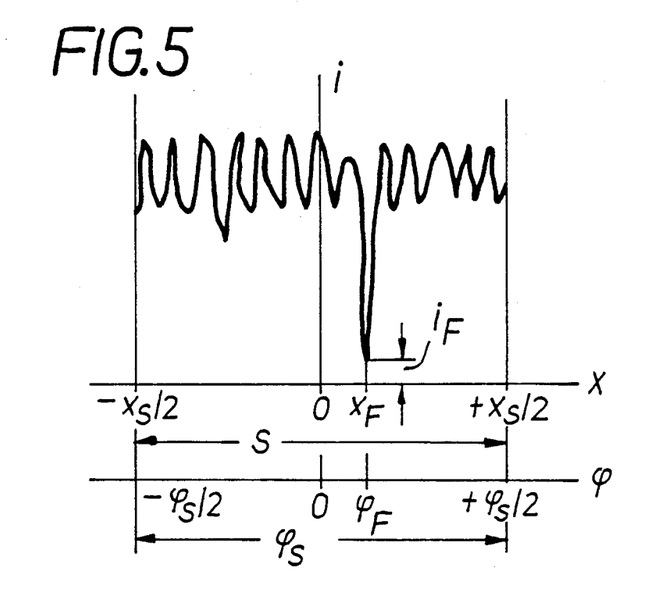
FIG. 5 is a graph illustrating the scattered beam intensity of another measuring state as a function of the scan angle.

The scanner 12 is provided with a possibly integrated angle pickup or path pickup 32, shown separately in FIG. 3, with which there may be determined the respective scan angle position $\phi$ of the mirror 14 relative to its "normal" center position and—with a known distance from the center of the mirror 14 on the pivot axis 13 up to the focal spot 24 of the focused laser measuring beam 17'—the respective distance x of the axis of the laser measuring beam 17' from the respective center position or desired position (corresponding to plane 18 and point 0 in FIGS. 4 and 5, respectively). Due to a certain surface roughness inherent in industrial products, a reflected scattered light is produced by the laser measuring beam 17', part of which—shown in FIG. 1 as the laser beam bundle 25—reaches the photodiode 26. The output signal produced by the scattered light in the photodiode 26 is conducted through a demodulating filter 33 tuned to the modulation frequency $f_M$ and through a low-pass filter 34 tuned to the frequency of the scanner 12 and for a desired local resolution of 0.05 mm. The signal appearing at the output of low-pass filter 34 has the intensity i.

FIG. 4 shows, in an idealized way, the curve of the intensity i produced by the scattered light reflected from the surface as a function of the deviation x of the focal spot 24 of the laser measuring beam 17' from the center or desired position. Such a representation can be obtained on an oscillograph 35 connected with the outputs of the photodiode 26 and the low-pass filter 34. Seen in the scanning direction, that is, in the direction of the abscissa, the illustrated range corresponds to the scanning width s, that is, the scanning range $-x_s$ to $+x_s$. This range corresponds to a scan angle range $\phi_s$, that is, an angular deviation from the center position of the mirror 14 of $-\phi_s/2$ to $+\phi_s/2$.

The scattered beam intensity i measured at the output of the low-pass filter 34 is dependent upon the microstructure as well as the macrostructure of the workpiece surface 5. When scanning the workpiece surface 5 proper, always scattered light is obtained which, due to the roughness of the workpiece surface, contains more or less noise signals. As concerns the workpiece surface, the scattered beam intensity i fluctuates—with some simplification—within a range from $i_1$ to $i_2$. The macrostructure of the surface 5 includes the weld groove 6 whose position is to be determined. Due to the presence of a focal spot 24 of about 30 μm from the focused laser measuring beam 17' and a comparatively large remaining gap width which exists at many places of the weld groove even with abutting workpieces, the weld groove 6 effects a complete absorption of the laser measuring beam 17' and of the scattered light produced thereby. Thus, impingement of the focused laser measuring beam 17' on the prepared weld groove 6 and the passage thereof through the spot 24 causes practically no reflection or scattering of the laser light and a short-term signal break-in results at the output of low-pass filter 34 for intensity i down to a minimum low value $i_F$ (index "F" stands for "groove").

The measurement image shown in FIG. 4 indicates that the weld groove 6 is disposed precisely in the center of the scanning region s, that is, at its desired position. Adaptation of the position of the workpieces 7 and 8, which form the weld groove, relative to the laser welding head 2 and the focal spot 9 of the laser working beam 3' by means of an adjustment device 36 is thus not necessary in this case.

The measurement image of FIG. 5 illustrates that the intensity signal $i_F$ corresponding to the prepared weld groove 6 is associated with a scanning angle $\phi_F > 0$. Thus, the weld groove 6 is not in its desired position relative to the axis of the laser working beam 3'. The relative position must therefore be corrected according to scanning angle $\phi_F$ by means of the adjustment or follow-up device 36.

The outputs of the low-pass filter 34 and the angle pickup 32 are each connected separately with an evaluation computer 37 in which the course of intensity signal i is stored as a function of the scanning angle $\phi$ of several measuring cycles (corresponding to several oscillations of the deflection mirror 14).

Figure 6:
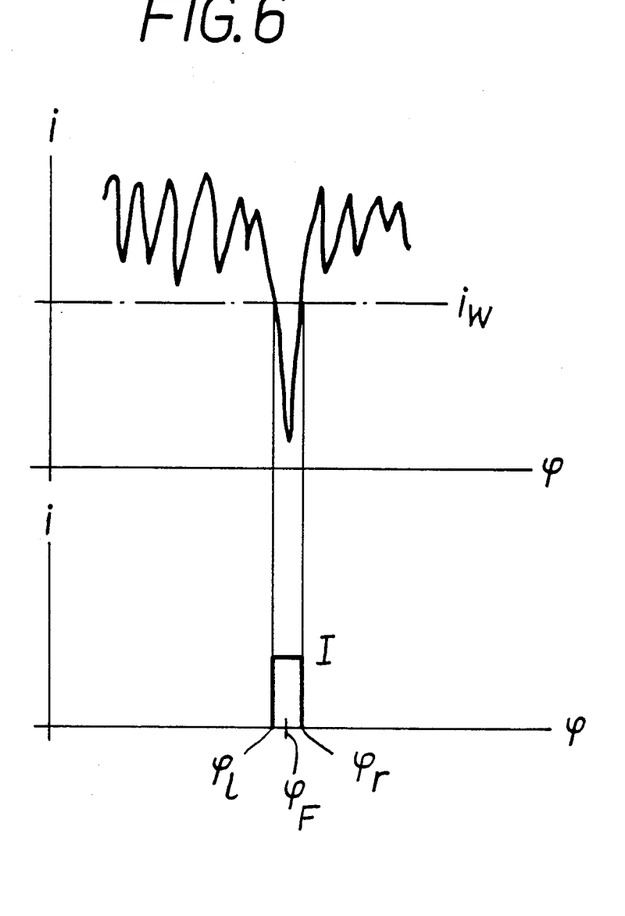
FIG. 6 is a graph illustrating the conversion of a signal break-in with the aid of a threshold operation.

Each signal curve i is subjected in the evaluation computer 37 to a so-called threshold value operation in which all discrete values i of the signal curve are compared with a predetermined threshold $i_W$ as shown in FIG. 6. All values $i > i_W$ are converted to a zero signal value, that is, they are ignored in the evaluation, while all values $i \leq i_W$ are converted to a constant signal value I. It is noted that in FIG. 6, the signal I obtained from the signal curve i of FIG. 5 is shown greatly distorted in the direction of the ordinate. From the functions $i = f(\phi)$ and $\phi = F(i)$ there are obtained the two "limit angles" $\phi_l$ and $\phi_r$ between which signal I exists. The center of the weld groove 6 is associated with the angle $\phi_F = (\phi_l - \phi_r)/2$. The respective deviation $x_F$ is obtained from the angle $\phi$ and the concrete technical parameters of the apparatus 1.

Figure 7:
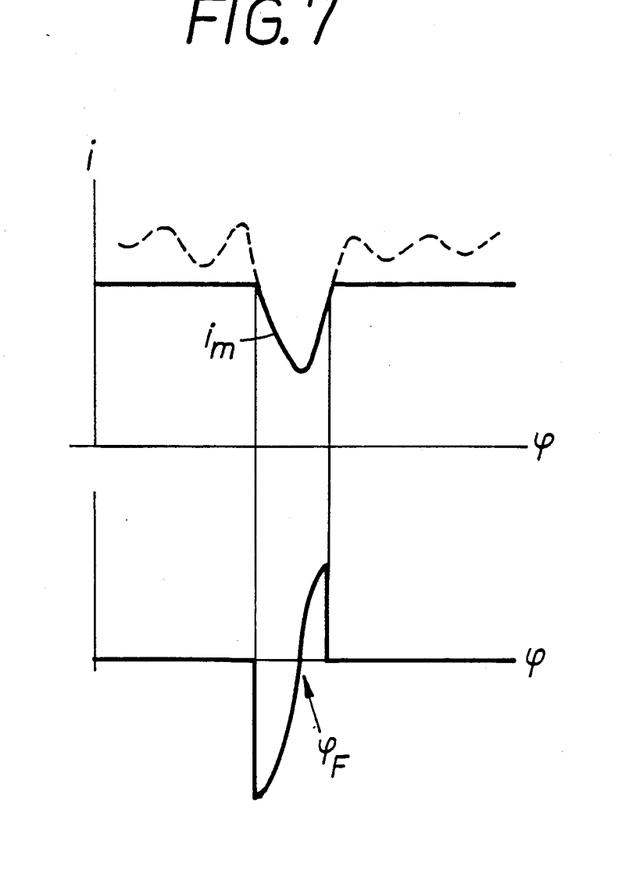
FIG. 7 is a graph illustrating the deviation of the groove in the desired position by local filtering and differentiation.

The position of the weld groove 6 may further be determined by subjecting the signal curve i to a so-called local filtering. In performing such a determination, for each discrete value i of the signal curve an average value is formed from the value i and an arbitrary value n before the value i and from the value i and the arbitrary value n after the value i. As a result, smaller signal differences are flattened, while the signal break-in $i_F$ remains clearly in effect. To save computer capacity, the local filtering is expediently performed in connection with the threshold value operation. For this purpose, the values $I_m$ which exceed the threshold value $i_W$ and which are determined by local filtering, may be converted to the constant threshold value. A signal curve $i_m$ obtained in this way is shown at the top of FIG. 7 (greatly distorted in the ordinate direction). This signal curve is then differentiated and results, for example, in the signal curve shown at the bottom of FIG. 7. The groove signal $\phi_F$ then results as the zero passage of the differentiation curve. This method is of particular advantage if the groove signal $i_F$ does not lie in the middle between the cut-off values $i(\phi_l)$ and $i(\phi_r)$.

In order to prevent signal break-ins produced by scratches on the surface 5 of the workpieces 7 and 8 from being interpreted as groove signals, the values determined to be groove signals are compared with preceding values. If the determined values deviate excessively from preceding values, the welding process will be interrupted.

The determination of the deviation $x_F$ of the weld groove 6 from its desired position by way of the corresponding angular deviation $\phi_F$ is effected expediently with at least 200 Hz.

In order to substantially suppress interfering radiation emanating primarily from the laser welding plasma, a narrow-band interference filter 39 tuned to the wavelength of the laser diode 11 is disposed upstream of the second optical focusing system 23.

The laser measuring beam 17' is focused on the spot 24 by means of the optical focusing system 15 formed of an achromat composed of two convex and concave lenses 41 and 42.

In order to make the signal break-in $i_F$ as clear as possible when the focused laser measuring beam 17' traverses the prepared weld groove 6, an additional lens 43 having a cylindrical component is associated with the optical focusing system 15. The axis of the cylindrical lens 43 is oriented in the direction of the weld groove 6 so that the focal spot 24 of the laser measuring beam has the shape of a "focal ellipse" whose major axis is oriented parallel to the weld groove. The curvature of the cylindrical lenses is advisably selected so that the "focal ellipse" has an axis ratio of 10:1. This measure reduces possible interference signals (scratches, striations) from the surface 5 of the workpieces 7 and 8 to be joined.

It will be understood that the above description of the present invention is susceptible to various modifications, changes and adaptations, and the same are intended to be comprehended within the meaning and range of equivalents of the appended claims.

What is claimed is:

1. In a laser welding process including the steps of
    guiding a laser welding beam along a weld groove defined by two abutting workpieces,
    determining the actual position of the weld groove relative to a predeterminable desired position of the weld groove; said determining step including the steps of
    deflecting a collimated and focused laser measuring beam across the path of the weld groove during co-travel with the laser welding beam along the weld groove;

directing the laser measuring beam to the workpieces;

sensing, by an electro-optical sensor, rays of the laser measuring beam reflected by the workpieces;

generating, by the sensor, measuring signals in response to the sensed reflected rays;

applying follow-up signals in response to the measuring signals, and correcting the position of the laser welding beam by a follow-up device in response to the follow-up signals applied thereto;

the improvement comprising the steps of (a) oscillating, in the performance of the deflecting step, the laser measuring beam with a deflecting frequency of at least 100 Hz;

(b) modulating the intensity of the laser measuring beam with a frequency of at least 200 kHz;

(c) causing the laser measuring beam to impinge on the workpieces at a distance of maximum 10 mm from the central longitudinal axis of the laser welding beam; and (d) using, in the performance of said sensing, step, a single light-sensitive element as the electro-optical sensor.

2. A method as defined in claim 1, wherein said deflecting frequency is at least 200 Hz.

3. A method as defined in claim 1, wherein said distance is maximum 5 mm.

4. A method as defined in claim 1, further comprising the steps of generating a signal representing a light intensity threshold value; comparing the measuring signals generated by the sensor with the signal representing the light intensity threshold value; and applying to an evaluating means solely those measuring signals whose value is below that of said threshold value.

5. In a laser welding apparatus guidable along a weld groove defined by two abutting workpieces, including means for focusing a laser welding beam on the workpieces;

determining means for ascertaining the actual position of the weld groove relative to a predeterminable desired position of the weld groove; said determining means including means for generating a collimated laser measuring beam;

a mirror arranged in the path of the laser measuring beam for reflecting the laser measuring beam towards the workpieces;

means for oscillating said mirror;

means for focusing said laser measuring beam on said workpieces;

sensor means for detecting light of said laser measuring beam reflected from said workpieces and for generating measuring signals in response to the sensed light; and follow-up means for receiving signals as a function of the measuring signals for correcting the position of the laser welding beam;

the improvement comprising (a) means for modulating the intensity of the laser measuring beam;

(b) an achromat forming said focusing means and having at least one convex lens and at least one concave lens;

(c) an angle pickup means for determining momentary angular positions of said mirror during oscillation thereof;

(d) a demodulating filter operatively connected to an output of said sensor means;

(e) a low-pass filter operatively connected to an output of said demodulating filter; and (f) an evaluating computer having inputs operatively connected to respective outputs of said angle pickup means and said low-pass filter; said evaluating computer having an output operatively connected to an input of said follow-up means.

* * * * *